Feb. 7, 1967     E. I. VALYI     3,302,559
METHOD AND APPARATUS FOR PRINTING ON THE SURFACE
OF PLASTIC HOLLOW OBJECTS
Filed Sept. 9, 1965
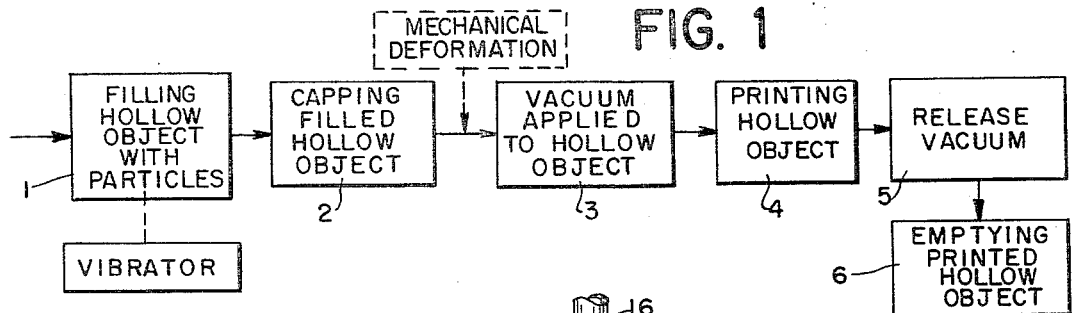
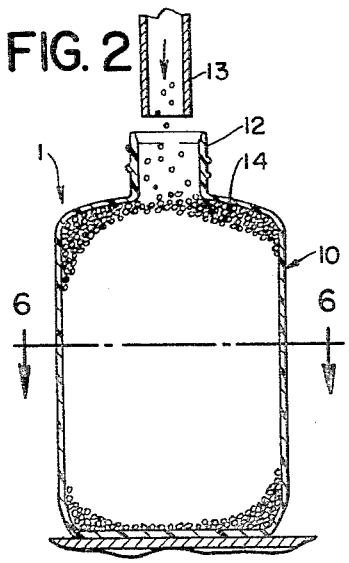
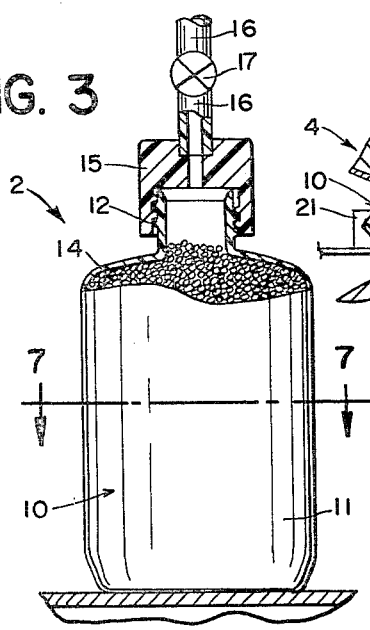
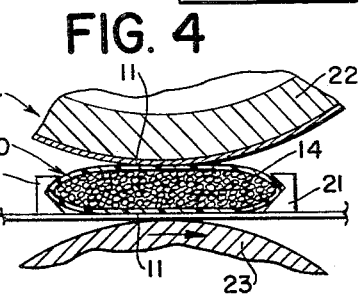
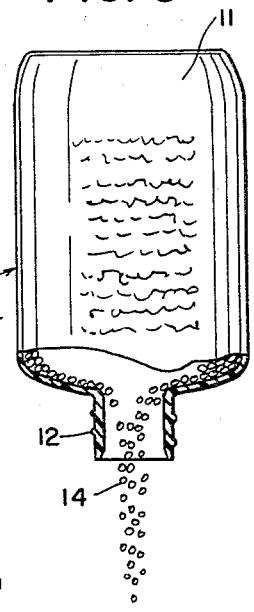
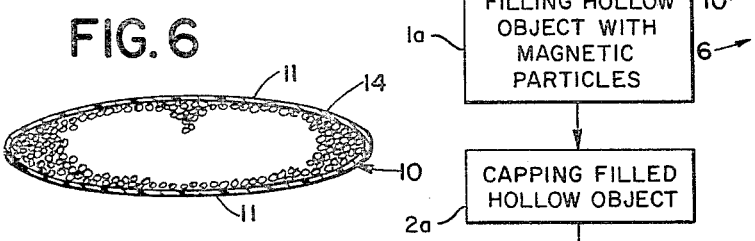
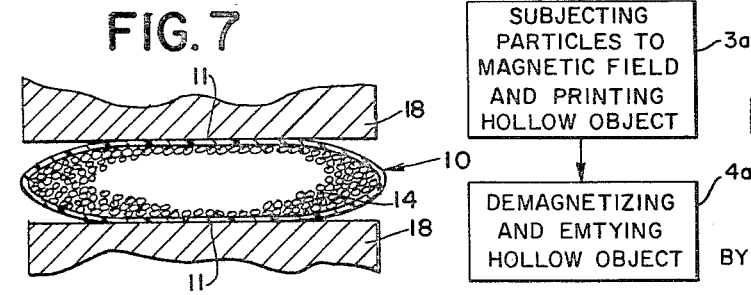
INVENTOR.
EMERY I. VALYI
BY
ATTORNEY

United States Patent Office 3,302,559
Patented Feb. 7, 1967

3,302,559
METHOD AND APPARATUS FOR PRINTING ON THE SURFACE OF PLASTIC HOLLOW OBJECTS
Emery I. Valyi, 5200 Sycamore Ave., New York, N.Y. 10071
Filed Sept. 9, 1965, Ser. No. 486,156
9 Claims. (Cl. 101—36)

This invention relates to a method and apparatus for printing on the surface of deformable hollow plastic objects.

In offset-printing or flexographic printing, the object onto which an image is to be transferred by the printing rolls must hold its shape rather than deform, or else sharpness of the printed pattern will be diminished and also it will be difficult to maintain registry in multicolor printing. Decorating of plastic containers by offset-printing is successfully practiced with shapes and kinds of objects in which the wall may be adequately supported and kept from deforming. Thus, it is quite easy to print on squeeze tubes because it is possible to insert a mandrel through the open end. In the case of bottles, the only expedient available to minimize deformation is to apply internal pressure during the printing operation, pressures up to 40 p.s.i. being frequently used. Obviously, an object subjected to internal pressure will deform to an extent depending upon the characteristics of the material from which it is made and depending on its shape. Round bottles made, for example, of linear polyethylene will deform comparatively little while oval bottles will bulge out appreciably.

An object of the present invention is to provide means for immobilizing the walls of a plastic object during the printing operation so that printing pressure can be applied thereto without causing deformation of the walls which would interfere with the sharpness of the printing and the registration in multicolor printing.

According to this improved method, the object is not subjected to internal pressure, but instead vacuum is applied inside, allowing atmospheric pressure on the outside to compress the body of the object, taking advantage of the fact that radial and tangential deformation in the shapes here considered is substantially smaller under external pressure than under internal pressure. Obviously, some shapes may not withstand such compression and tend to panel. For that reason it is proposed that the objects be filled with a material which resists inward collapse or paneling of the walls of the object. Since the substance with which the object is filled must be removed before the object may be used for its intended purpose and because contamination of the object must be prevented, the fill may consist of a free flowing powdery or particulate, inert substance.

According to this method, therefore, preparatory to printing, the object is filled with free flowing, preferably spherical particles of steel or other metal, or of glass, or of several of the hard refractories. Filling is preferably carried out under conditions of vibration or tamping to assure uniform and dense packing of the particles within the object. Commercially available equipment for filling may be employed. After the object is filled with the particulate substance, a cap is applied which is designed to retain the fill at the level it has assumed after the filling operation and thereafter vacuum is applied inside the object through the same cap. Since the fill material, which consists of discrete particles, is highly permeable, the application of vacuum will be instantly effective, with the result that the outside walls of the object will be pressed with atmosphere pressure against the confined fill. Thereby adequate support for printing will be provided.

After completing the printing operation, the vacuum is released, the cap removed and the free flowing particulate fill material allowed to flow out of the object, which it will do without leaving any residue.

Particularly suitable fill materials are spherical glass or steel particles or hollow steel beads. If the latter are used it is further possible to compact and consolidate the fill by subjecting it to a magnetic field. The reason for using hollow steel beads rather than spherical steel or iron particles is to minimize the weight which would tend to deform the container outwardly in the course of filling. However, solid steel spheres, i.e. shot, may be employed under proper circumstances.

The nature of the invention will be better understood from the following description, taken in connection with the accompanying drawing in which a specific embodiment has been set forth for purposes of illustration.

In the drawing:

FIG. 1 is a block diagram illustrating steps of a method of printing non-circular objects;

FIG. 2 is a vertical section through a container that is being filled;

FIG. 3 is a plan view, partly in section, of the container at the vacuum station;

FIG. 4 is a sectional view of the container at the printing station;

FIG. 5 is a plan view, partly in section, of the container at the emptying station;

FIGS. 6 and 7 are sectional views taken along the lines 6—6 and 7—7 of FIGS. 2 and 3 respectively; and FIG. 8 is a block diagram showing the steps involved when using a magnetizable particulate material as a filler.

Referring to the drawing more in detail, the various steps in the method are illustrated in FIG. 1 as comprising station 1 in which the object is filled with a particulate material of the type above specified while being vibrated or tamped to compact the material and to cause the material to provide maximum support for the walls of the object.

At station 2 the filled object is capped with a cap which is capable of sealing the contents of the object and which is provided with means for evacuating the object and for maintaining the vacuum during the subsequent printing stage. The cap may carry spring-pressure-actuated means for maintaining suitable pressure on the fill.

At station 2, the sides of the object may be compressed so as to provide a flat printing surface if the contour of the walls is such that the printing operation would be difficult without such deformation of the walls.

At station 3, the container is evacuated to an extent such that its walls are pressed by atmospheric pressure against the fill therein, whereby the particulate material becomes rigid and provides a firm support for the walls of the object. The cap is then sealed so as to retain the vacuum and the object is transported to station 4 wherein the walls are printed by the usual offset printing rolls. If the walls are in oval or other non-flat form suitable means is provided to turn the object as it advances so that a line contact is maintained with the printing rolls as the printing progresses. If the walls have been flattened prior to evacuation, they are maintained in this form by the pressure differential and remain flat during the printing operation so that no rotation or turning of the object is required.

After printing, the cap is opened at station 5 to release the vacuum and the cap is removed and in station 6 the particulate material is poured out of the object.

The particulate material should be of a size such that it does not become embedded in the walls of the object, so that it becomes free flowing when released and can be removed without leaving any undesirable trace in the object.

FIG. 2 illustrates a container 10 of oval cross-section having convex opposed side walls 11 and having a threaded neck 12 disposed below a filling chute 13 and being filled with a particulate material 14 as it would appear in station 1 of FIG. 1.

FIG. 3 illustrates the container 10 in station 2 wherein a cap 15 is affixed to the threaded neck 12 of the container. This cap 15 is provided with a tube 16 which is adapted to be conected to a source of vacuum not shown and may be closed by a valve 17 for maintaining the vacuum in the container. Opposed walls 11 are shown as being flattened by platens 18 (FIG. 7) so as to provide a flat printing surface. If desired, this step may be omitted and the walls may remain in oval form as indicated in FIG. 6.

FIG. 4 illustrates the filled and evacuated container 10 in printing station 4. The container 10 is shown as carried on a conveyor 20 having positioning lugs 21 under a printing cylinder 22 of the conventional offset type. A pressure roll 23 which may be spring-pressed supports the container in contact with the printing cylinder 22.

The container is indicated in FIG. 4 as having flat printing surfaces 11. In the event that the printing surfaces are oval or other non-flat shape, it is to be understood that suitable means is provided to rotate or orient the container as it passes the printing roll so that the printing surface is maintained normal to the printing roll at the line of contact.

After the container has been printed, the vacuum is broken by opening the valve 17 and the cap 15 removed, the container is inverted in station 6 as indicated in FIG. 5 and the particulate material 14 poured out. The walls thus resume their original shape.

It is to be understood that suitable conveyor means may be provided for advancing the container through the various stations and for indexing the container for the various steps above described.

Alternatively when using iron or steel particles which are magnetic rigidity may be secured by providing electromagnets in advance of or at the printing station in a position to subject the particles in the container to a magnetic field. Subsequently the particles may be demagnetized by suitable conventional means, such as by subjecting them to an alternating field so as to facilitate the removal of the particles from the container.

FIG. 8 illustrated the steps involved when using a magnetizable particulate material. Referring to this figure, in step 1a the hollow object is filled with a magnetizable material such as iron or steel balls or beads. After filling and with or without tamping, the object is capped in step 2a. In step 3a the object is placed in a magnetic field which is capable of magnetizing the particles and forming them into a rigid mass. If additional rigidity is required, the object may also be evacuated. The object is then printed at the printing station which may or may not be the same as the magnetizing station. If the particles posess magnetic retentivity they are demagnetized at station 4a and the particles removed from the object. Of course, if the particles do not have magnetic retentivity the demagnetizing step may be omitted.

What is claimed is:
1. The method of printing on the surface of a deformable plastic hollow object having deformable walls which comprises filling said object with removable particulate material which is inert to the material of said walls and is of a size such that it remains free of said walls after being subjected to printing pressure, applying from an outside source a rigidifying force to temporarily rigidify said particulate material to form a support for said walls and subjecting said walls to printing pressure in a printing zone, removing the rigidifying force to release said particulate material, and removing the same from said hollow object after printing.

2. In the method of claim 1, the additional step of tamping said particulate material for compacting the same before rigidifying.

3. The method set forth in claim 1 in which said particulate material comprises spherical glass, metal or refractory particles or hollow beads.

4. The method of printing on the surface of a deformable plastic hollow object having deformable walls which comprises filling said object with particulate material which is inert to the material of said walls and is of a size such that it remains free of said walls after being subjected to printing pressure, subjecting said object with said material therein to a vacuum adapted to rigidify said particulate material and form a rigid support for said walls and subjecting said walls to printing presure in a printing zone while maintaining said vacuum therein.

5. In the method of claim 4, the additional step of applying external pressure to said walls prior to evacuation to flatten a wall of said object for printing.

6. The method of printing on the surface of a plastic hollow object having deformable walls which comprises filling said object with spherical steel particles or hollow steel beads, subjecting said filled container to a magnetic field adapted to rigidfy said material so as to form a rigid support for said walls, printing on said walls while so supported, and removing the material from said object.

7. In the method set forth in claim 6, the additional step of de-magnetizing said particles or beads to facilitate their removal from said object.

8. Apparatus for printing on the surface of a plastic hollow object having deformable walls, comprising means for filling said object with particulate material, means subjecting said filled object to a vacuum adapted to rigidfy said material and to form a rigid support for said walls, a printing station having a printing cylinder, and means feeding said evacuated object to said printing station for printing.

9. Apparatus as set forth in claim 8 including platens disposed to flatten opposed walls of said object after the filling of said object and prior to the evacuation thereof.

References Cited by the Examiner
UNITED STATES PATENTS 2,738,827  3/1956  Roll _____ 53—131
3,227,071  1/1966  Szczepanski _____ 101—42

ROBERT E. PULFREY, *Primary Examiner.*

W. McCARTHY, *Assistant Examiner.*